Figure 1:
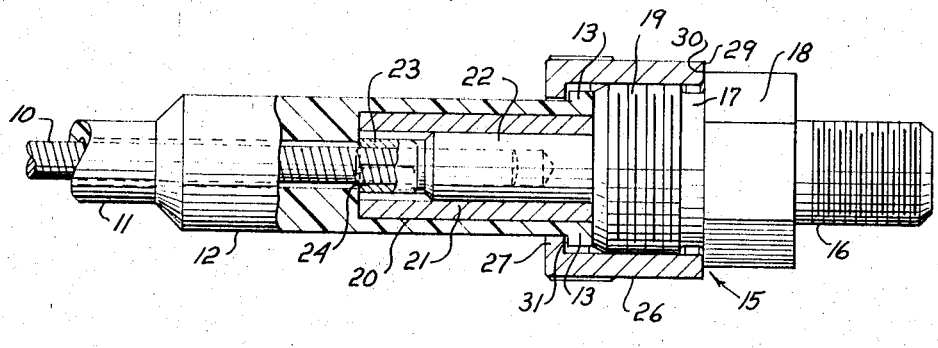

March 12, 1968  J. F. DALTON  3,372,560

FLEXIBLE DRIVE SHAFT COUPLING ASSEMBLY

Filed Aug. 25, 1966

INVENTOR.
JOHN F. DALTON
BY
Synnestvedt & Lechner
ATTORNEYS

United States Patent Office 3,372,560
Patented Mar. 12, 1968

3,372,560
FLEXIBLE DRIVE SHAFT COUPLING ASSEMBLY
John F. Dalton, Worcester, Pa., assignor to N. W. Controls, Inc., North Wales, Pa., a corporation of Pennsylvania
Filed Aug. 25, 1966, Ser. No. 574,960
5 Claims. (Cl. 64—4)

This invention relates to means for coupling a flexible shaft to a driving member.

Flexible shafts of the type with which coupling assemblies of the present invention are used commonly include an inner flexible core covered with an outer flexible sheathing and have wide spread use in industry as cables for tachometers, speedometers and for transmitting rotational motion to other instruments or pieces of light machinery. The present invention is concerned with improvements in the means for coupling such a cable to a rotating shaft.

The primary object of the invention is the provision of an easily assembled and installed connector for coupling the flexible shaft to a rotating member.

Another object of the invention is the provision of a cable connector which is extremely simple in design and which eliminates whipping or binding of the flexible core within the assembly.

A still further object of the invention is the provision of a cable connector which has the qualities of dependability, durability, resistance to moisture and to weathering needed for mechanisms of this type.

These and various other objects of the invention are achieved by an assembly which includes a sleeve bonded to the end of the flexible shaft. The sleeve has an external radial flange extending from the end thereof. An adapter is provided with a body having an externally threaded portion. A coupling member which is integral with the adapter body is connectible to a rotating shaft of the machine to which the cable is to be connected. A threaded shaft extends from the other end of the body portion. The threaded shaft terminates in an axially extending coupling recess within which the flexible core is adapted to fit. The shaft is journalled within a bearing mounted on an axial bore in the sleeve. A retaining nut is provided with a threaded portion, the threads of which cooperate with the threads on the body of the adapter so that the nut and the adapter rotate together. The retainer nut has an inwardly extending flange which is axially spaced from the external flange on the collar. The flanges cooperate to retain the flexible cable in axial position with respect to the adapter and thus with respect to the drive member.

Figure 2:
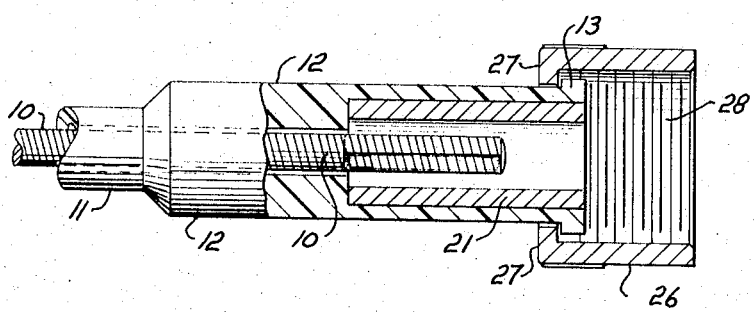

With the foregoing in view, the illustrative embodiment of the invention will now be described. In the drawings:

FIGURE 1 illustrates a coupling assembly with portions thereof being shown in section; and FIGURE 2 indicates the coupling assembly shown in FIGURE 1 with the adapter member removed for purposes of clarity.

As noted above, flexible cables of the type used in conjunction with the coupling assembly of the present invention include an inner flexible core member 10 and an outer sheath 11. The core member 10 is commonly formed of a plurality of layers of alternately extending helically wound and longitudinally extending filaments of steel. While the sheathing may be formed from a variety of materials, various plastics are particularly well suited for the purpose. Typical plastic materials are polyamides or high density polyethylenes. Longitudinally and/or helically extending steel and/or glass fiber filamentary material is usually embedded in the sheath.

A sheath or sleeve 12 having an enlarged diameter with respect to sheath 11 is secured to the end of the sheathing 11. Sleeve 12 is preferably formed from polyethylene plastic, although in conditions where temperatures above about 180° F. are encountered, it may be desirable to form this sleeve of nylon or Teflon. Sleeve 12 is typically bonded to the end of the sheath 11 under heat and pressure. The sleeve is provided with a radially extending flange 13 for reasons to be described hereinafter.

The coupling assembly includes adapter 15, shown in FIGURE 1. The adapter is provided with a threaded end portion 16 for connection to the shaft of the machinery which is to drive the flexible core. The adapter also includes an intermediate body portion which comprises a portion 17 on which are formed wrench receiving surfaces 18, and also includes a second threaded portion 19.

Sleeve 12 is provided with a counter bore 20 in which a bearing 21 is fitted. The bearing is preferably formed of bronze although other low friction material could be used. A shaft 22 extends from the body 19 of the adapter and is journalled for rotation within the bearing 21.

Shaft 22 is provided with an end portion 23 of reduced diameter. An axially extending bore 24 is provided in the end of the shaft 22. Preferably the portion of the shaft having a reduced diameter is squeezed so that the recess within the area of reduced diameter assumes a square cross section. The end of the core, as is evident from FIGURE 2, is also squeezed so that it has a square cross section. Thus, when the core fits within the coupling recess, relative motion between the two parts is prevented and rotational movement of the drive member is transmitted to the core.

Coupling nut 26 fits over the sleeve 12 and is loosely mounted for axial movement with respect thereto. The coupling nut 26 is provided with an inwardly radially extending flange 27 and is dimensioned so that clearance is provided between the inner periphery of the flange and the outer diameter of the sleeve. The retainer nut is internally threaded as shown at 28, these threads being adapted to interfit with the threads 19 on the body of adapter 15.

The retainer nut is adapted to be threaded all the way on to the adapter until the face 29 of the nut 26 bears against a shoulder 30 on the body of adapter 15. In that position, a clearance is provided between the flange 27 and the flange 13 as is shown at 31. Flange 27 extends inwardly beyond the outer diameter of the flange 13 so that the sleeve and the flexible cable are retained in the desired axial position with respect to the adapter member 15. Nevertheless, sufficient clearance is provided so that the nut and adapter can turn freely with respect to the sleeve.

With the coupling assembly disclosed, the shaft of the adapter extends a substantial distance into the body of the sleeve 21. The shaft 22 and the relatively large size of the bearing 21 assure that no play is presented within the coupling, eliminating the possibility of buckling or whipping of the flexible core and reducing maintenance and breakdown.

Attaching the flexible shaft to a rotatable element requires a minimum modification of that element. The adapter is merely threaded into a hole threaded in the shaft for that purpose Cables having coupling assemblies formed according to the teachings of the present invention have been of particular utility as instrument cables for farm equipment where the assemblies are constantly exposed to extremes in temperature, to rain and dust. The arrangement has proved to be very effective in such use and shafts equipped with coupling assemblies formed according to the invention have been operated for thousands of hours at high speeds without noticeable wear.

I claim:

1. In a flexible shaft including an inner rotatable flexible core and an outer sheath covering said core; an assembly for coupling said shaft to a rotatable drive member comprising a sleeve bonded at one end to the end of said sheath, the other end of the sleeve having an external radial flange, a bearing fitted within said sleeve, an adapter for connecting said core to said rotatable drive member including a central threaded body portion, connector means integral with said body and extending from one end thereof for securing the adapter to the drive member, a shaft of reduced diameter extending from the other end of the body portion, said shaft fitting within said sleeve and being journalled for rotation in said bearing, an axially extending coupling recess in the end of said shaft, said core being adapted to fit within said recess for rotational movement therewith, a retainer nut slideably mounted on said sleeve, said nut having an internally threaded portion, the threads on said nut being adapted to interfit with the threads on the body of said adapter for rotation therewith, said nut further having an inwardly extending flange, said flange being axially spaced from the sleeve flange and being adapted to prevent separation of said shaft assembly from said adapter, said nut being dimensioned to provide for axial clearance of said flanges when said threads are interfitted.

2. An assembly according to claim 1, wherein said means for securing the adapter to the drive member is a threaded shaft and further wherein said body is provided with wrenching surfaces on said adapter for securing the adapter to the drive member.

3. An assembly according to claim 1, wherein the end of said flexible core has a substantially square cross section, and said coupling recess has a shape complementary to that of the end of said core.

4. An assembly according to claim 1, wherein said adapter body is provided with a shoulder for limiting the axial movement of said nut.

5. An assembly according to claim 1, wherein said bearing is an elongated sleeve.

References Cited
UNITED STATES PATENTS

| | | | |
|---|---|---|---|
| 1,943,980 | 1/1934 | Mall | 64—4 |
| 2,243,960 | 6/1941 | Hotchkiss | 64—4 |
| 2,586,359 | 2/1952 | Mall | 64—4 |
| 2,793,532 | 5/1957 | Johnson et al. | 64—4 X |
| 2,801,530 | 8/1957 | Holt | 64—3 |
| 2,918,808 | 12/1959 | Botti | 64—4 |

HALL C. COE, *Primary Examiner.*